US012660044B2

(12) United States Patent (10) Patent No.: US 12,660,044 B2
Nayak et al. (45) Date of Patent: Jun. 16, 2026

(54) METHOD AND APPARATUS FOR LINK AND TRAFFIC LEVEL EPCS SETUP AND OPERATIONS

(71) Applicant: Samsung Electronics Co., Ltd., Suwon-si (KR)

(72) Inventors: Peshal Nayak, Plano, TX (US); Vishnu Vardhan Ratnam, Plano, TX (US); Rubayet Shafin, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 18/360,654

(22) Filed: Jul. 27, 2023

(65) Prior Publication Data

US 2024/0049354 A1 Feb. 8, 2024

Related U.S. Application Data

(60) Provisional application No. 63/472,761, filed on Jun. 13, 2023, provisional application No. 63/417,560, (Continued)

(51) Int. Cl.
*H04W 76/50* (2018.01)
*H04W 4/90* (2018.01)

(52) U.S. Cl.
CPC .............. *H04W 76/50* (2018.02); *H04W 4/90* (2018.02)

(58) Field of Classification Search
CPC ...................................................... H04W 4/90
(Continued)

(56) References Cited

U.S. PATENT DOCUMENTS

2022/0104071 A1* 3/2022 Jauh ...................... H04W 40/02
2022/0110053 A1* 4/2022 Chu .................. H04W 52/0216
(Continued)

FOREIGN PATENT DOCUMENTS

KR 10-2022-0089458 A 6/2022
WO 2021180541 A1 9/2021
WO 2023155804 A1 8/2023
WO 2023155804 A9 8/2023

OTHER PUBLICATIONS

Extended European Search Report issued Apr. 9, 2025 regarding Application No. 23852883.0, 10 pages.
(Continued)

*Primary Examiner* — Qutbuddin Ghulamali

(57) ABSTRACT

Methods and apparatuses for link and traffic level emergency preparedness communication services (EPCS) setup and operations are disclosed. A method for wireless communication performed by a non-access point (AP) multi-link device (MLD) that includes stations (STAs) comprises: forming a link with a corresponding AP of an AP MLD; receiving information associated with emergency preparedness communication services (EPCS) priority access from the corresponding AP; determining whether the EPCS priority access is enabled on all of the links between the STAs and the corresponding APs; when the EPCS priority access is enabled for all of the links between the STAs and the corresponding APs, continuing with current EPCS priority access; and when the EPCS priority access is not enabled for all of the links between the STAs and the corresponding APs, performing the EPCS priority access on some but not all of the links between the STAs and the corresponding APs.

17 Claims, 8 Drawing Sheets

Related U.S. Application Data filed on Oct. 19, 2022, provisional application No. 63/396,087, filed on Aug. 8, 2022.

(58) Field of Classification Search
USPC ...................................................... 455/404.1
See application file for complete search history.

(56) References Cited

U.S. PATENT DOCUMENTS

| | | | |
|---|---|---|---|
| 2022/0240264 A1* | 7/2022 | Chu ...................... | H04W 12/06 |
| 2023/0262786 A1* | 8/2023 | Montemurro ....... | H04W 74/085 |
| | | | 370/329 |

OTHER PUBLICATIONS

EEE P802.11be-D2.0 "Part 11: Wireless LAN Medium Access Control (MAC) and Physical Layer (PHY) Specifications—Amendment 8: Enhancements for extremely high throughput (EHT)" May 2022, 873 pages.

International Search Report and Written Opinion issued Nov. 8, 2023 regarding International Application No. PCT/KR2023/01145, 8 pages.

Wullert et al., "Resolution of EPCS-related CIDs in clause 4.5.13 (CC 266)", doc.:IEEE 802.11-22-1015r1, Jul. 2022, 6 pages.

Office Action dated Mar. 4, 2026, in connection with European Patent Application No. 23852883.0, 6 pages.

* cited by examiner

300

600

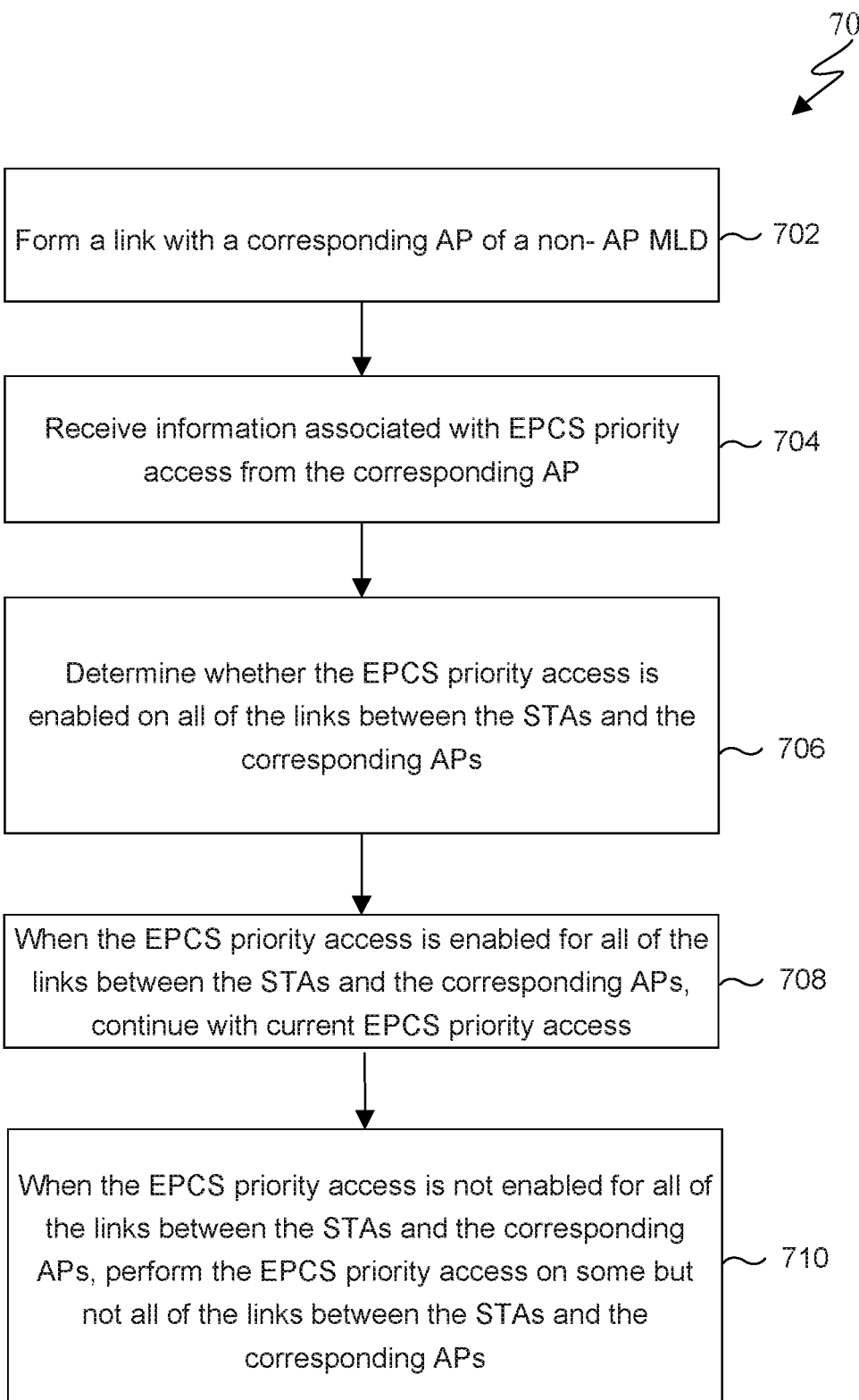

700

Form a link with a corresponding AP of a non- AP MLD ⟿ 702

Receive information associated with EPCS priority access from the corresponding AP ⟿ 704

Determine whether the EPCS priority access is enabled on all of the links between the STAs and the corresponding APs ⟿ 706

When the EPCS priority access is enabled for all of the links between the STAs and the corresponding APs, continue with current EPCS priority access ⟿ 708

When the EPCS priority access is not enabled for all of the links between the STAs and the corresponding APs, perform the EPCS priority access on some but not all of the links between the STAs and the corresponding APs ⟿ 710

FIG. 7

METHOD AND APPARATUS FOR LINK AND TRAFFIC LEVEL EPCS SETUP AND OPERATIONS

CROSS-REFERENCE TO RELATED APPLICATION AND CLAIM OF PRIORITY

This application claims priority under 35 U.S.C. § 119(e) to U.S. Provisional Patent Application No. 63/396,087 filed on Aug. 8, 2022; U.S. Provisional Patent Application No. 63/417,560 filed on Oct. 19, 2022; and U.S. Provisional Patent Application No. 63/472,761 filed on Jun. 13, 2023; which are hereby incorporated by reference in their entireties.

TECHNICAL FIELD

This disclosure relates generally to transmission efficiency in wireless communications systems that include multi-link devices. Embodiments of this disclosure relate to methods and apparatuses for link and traffic level emergency preparedness communication services (EPCS) setup and operations.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a feature that is currently being developed by the standards body for next generation extremely high throughput (EHT) Wi-Fi systems in IEEE 802.11be. The Wi-Fi devices that support MLO are referred to as multi-link devices (MLD). With MLO, it is possible for a non-access point (AP) multi-link device (MLD) to discover, authenticate, associate, and set up multiple links with an AP MLD. Channel access and frame exchange is possible on each link between the AP MLD and non-AP MLD.

SUMMARY

Embodiments of the present disclosure provide methods and apparatuses for link and traffic level EPCS setup and operations.

In one embodiment, a non-access point (AP) multi-link device (MLD) is provided, comprising: stations (STAs), each comprising a transceiver configured to: form a link with a corresponding AP of an AP MLD; and receive information associated with emergency preparedness communication services (EPCS) priority access from the corresponding AP. The non-AP MLD further includes a processor operably coupled to the transceivers, the processor configured to: determine whether the EPCS priority access is enabled on all of the links between the STAs and the corresponding APs; when the EPCS priority access is enabled for all of the links between the STAs and the corresponding APs, continue with current EPCS priority access; and when the EPCS priority access is not enabled for all of the links between the STAs and the corresponding APs, perform the EPCS priority access on some but not all of the links between the STAs and the corresponding APs.

In another embodiment, an AP MLD device is provided, comprising: APs, each comprising a transceiver configured to: form a link with a corresponding STA of a non-AP MLD; and transmit information associated with EPCS priority access to the corresponding STA. The AP MLD further comprises a processor operably coupled to the transceivers, the processor configured to: determine whether the EPCS priority access is enabled on all of the links between the APs and the corresponding STAs; when the EPCS priority access is enabled for all of the links between the APs and the corresponding STAs, continue with current EPCS priority access; and when the EPCS priority access is not enabled for all of the links between the APs and the corresponding STAs, perform the EPCS priority access on some but not all of the links between the APs and the corresponding STAs.

In yet another embodiment, a method for wireless communication performed by a non-AP device that includes STAs comprises: forming a link with a corresponding AP of an AP MLD; receiving information associated with EPCS priority access from the corresponding AP; determining whether the EPCS priority access is enabled on all of the links between the STAs and the corresponding APs; when the EPCS priority access is enabled for all of the links between the STAs and the corresponding APs, continuing with current EPCS priority access; and when the EPCS priority access is not enabled for all of the links between the STAs and the corresponding APs, performing the EPCS priority access on some but not all of the links between the STAs and the corresponding APs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example of a method for wireless communication performed by an AP device according to embodiments of the present disclosure.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: [1] IEEE P802.11be/D2.0, 2022.

Embodiments of the present disclosure provide mechanisms for link and traffic level EPCS setup and operations.

Figure 1:
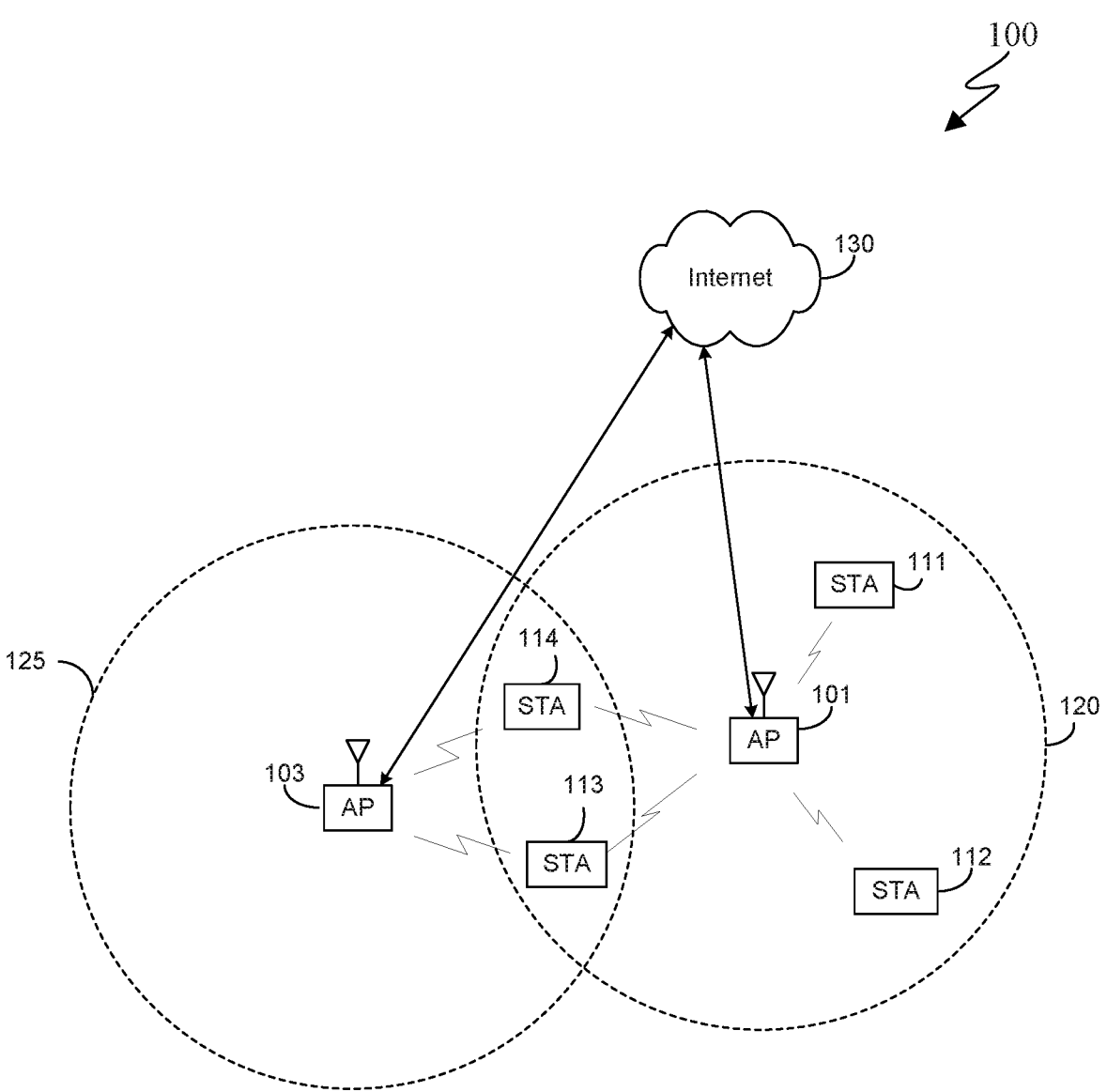
FIG. 1 illustrates an example wireless network according to embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for traffic urgency indication. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
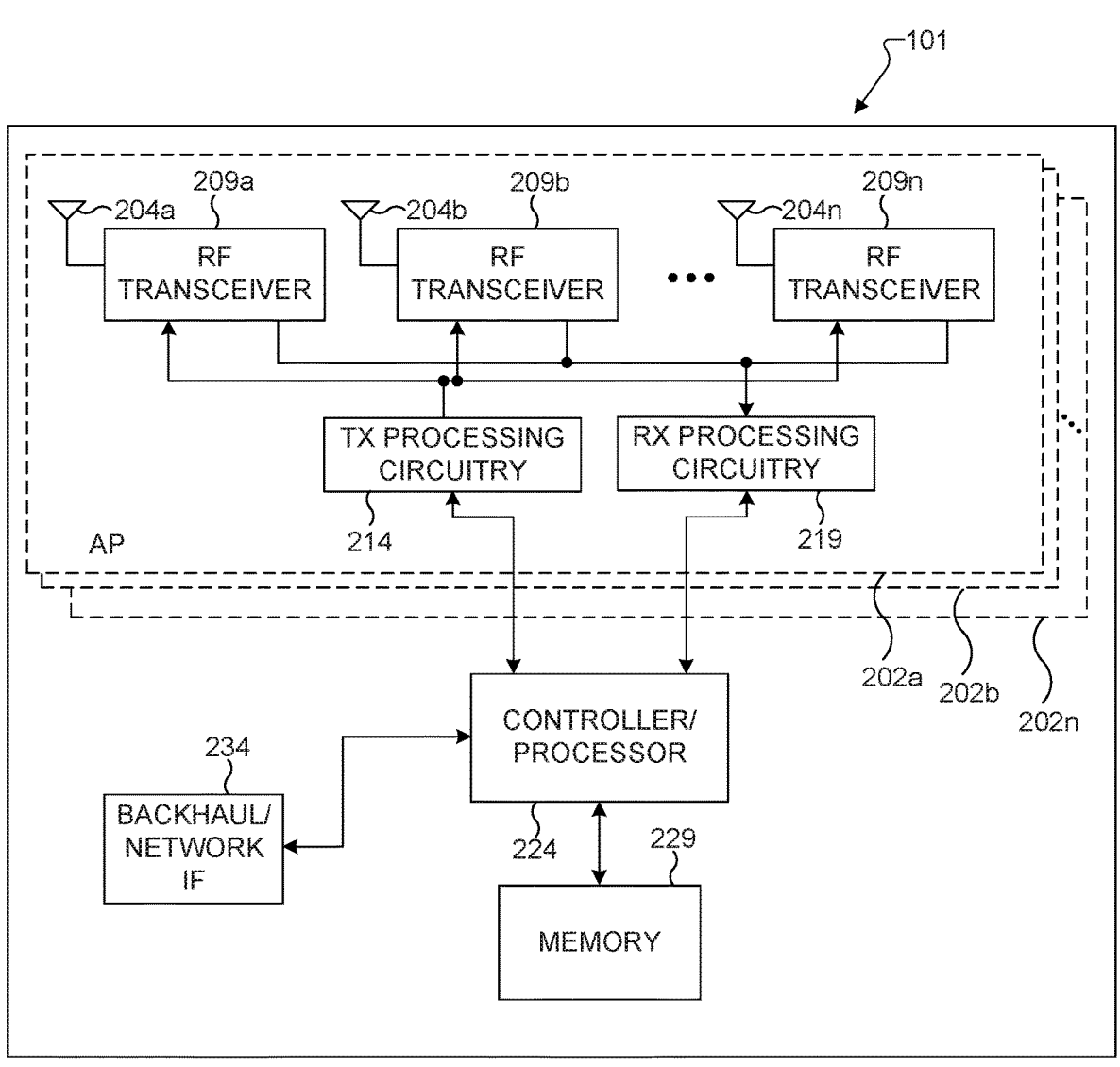
FIG. 2A illustrates an example AP according to embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including link and traffic level EPCS setup and operations. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for link and traffic level EPCS setup and operations. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
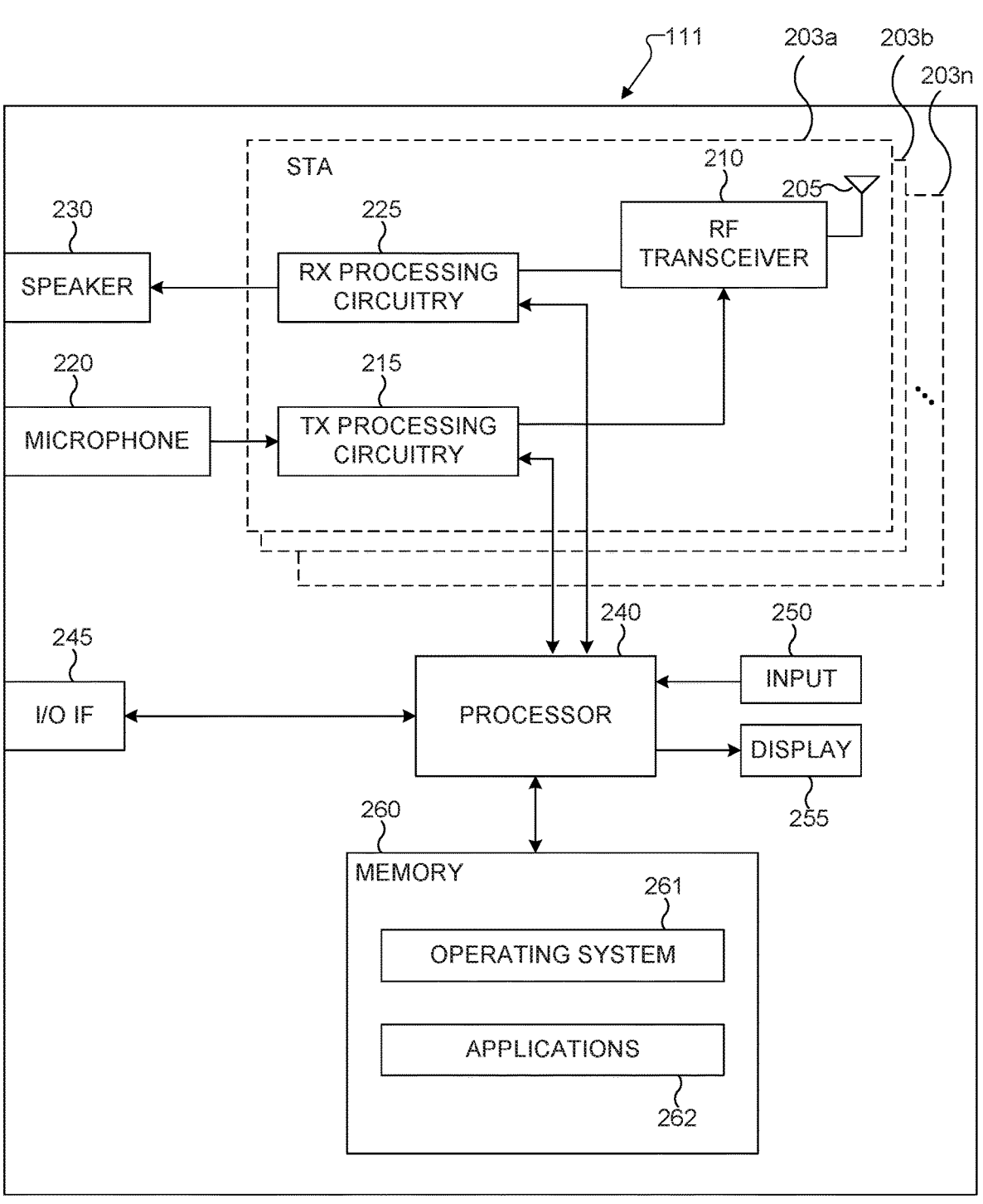
FIG. 2B illustrates an example STA according to embodiments of the present disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to support link and traffic level EPCS setup and operations. In some embodiments, the controller/processor 240 includes at least one microprocessor or microcontroller.

The controller/processor 240 is also capable of executing other processes and programs resident in the memory 260, such as operations for supporting link and traffic level EPCS setup and operations. The controller/processor 240 can move data into or out of the memory 260 as required by an executing process. In some embodiments, the controller/processor 240 is configured to execute a plurality of applications 262, such as applications for supporting link and traffic level EPCS setup and operations. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Emergency telecommunication services have been implemented in a number of countries with the objective of providing prioritized access in the times of disasters or emergencies. Examples of such telecommunication services in the united states include government emergency telecommunication service (GETS), wireless priority service (WPS), next generation network priority services (NGN priority services), telecommunications service priority (TSP), etc. Such services have also been implemented in other countries. Examples of such services include blue light mobile service in Belgium, mobile telecommunications privileged access scheme in Great Britain, disaster priority telephone in Japan, etc. Typically, such services are subscription based, operator controlled, enabled through global standards and are offered over commercial network infrastructure.

In recent times there has been a growing need for such services over Wi-Fi networks. In IEEE 802.11be, Emergency preparedness communication services (EPCS) has been introduced with the goal of providing prioritized access to certain authorized users. As a part of this service, the user that has associated with an AP can be authorized by the AP to take advantage of EPCS service. Once authorized, the user can use an enhanced EDCA parameter set with values for parameters such as CWmin[AC], CWmax[AC], AIFSN [AC], TXOP[AC], etc. which are different from those for other STAs associated with the same AP. With this enhanced EDCA parameter set, the non-AP MLD that is authorized by the AP, benefits from prioritized access as it can capture the channel faster compared to other users in the network. After EPCS is disabled, the non-AP MLD can update its EDCA parameter set to match that of other non-EPCS users in the network.

Various embodiments of the present disclosure recognize that when EPCS is authorized for a particular non-AP MLD, all the links between the non-AP MLD and the AP MLD acquire EPCS priority access. Further, all the traffic of the authorized non-AP MLD benefits from an enhanced EDCA parameter set provided by the AP for EPCS authorization. This can be inefficient for a number of reasons. For example, not every link may be suitable for EPCS operation (e.g., on some links there can be a lot of devices with latency sensitive traffic). Consequently, if this link is used for EPCS operation, then EPCS traffic can slow down the latency sensitive traffic from non-EPCS devices. In addition, a device can have a mixture of traffic from EPCS and non-EPCS applications. Consequently, if non-EPCS traffic from a device gains the same priority as EPCS devices, then this can be unfair to traffic from other devices on the same link. Further, a device may not need EPCS for all kinds of service types. For example, a mobile phone may be used for emergency voice services but not as a real time temperature sensor.

Accordingly, various embodiments of the present disclosure provide mechanisms for enabling and disabling EPCS for suitable links and traffic/service types.

Figure 3:
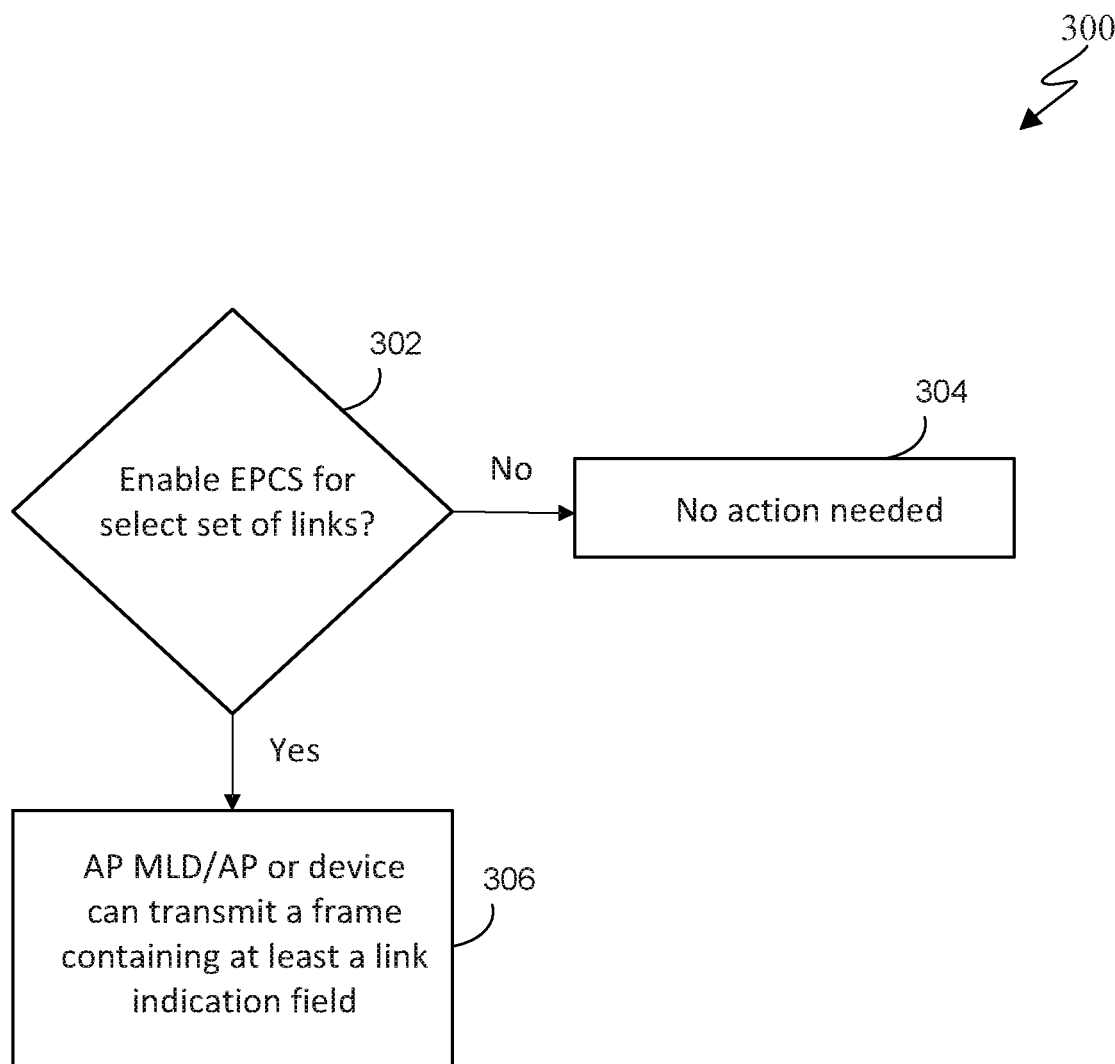
FIG. 3 illustrates an example method to enable link level EPCS priority access according to embodiments of the present disclosure.

FIG. 3 illustrates an example method 300 to enable link level EPCS priority access according to embodiments of the present disclosure. The embodiment of the example method 300 to enable link level EPCS priority access shown in FIG. 3 is for illustration only. Other embodiments of the example method 300 to enable link level EPCS priority access could be used without departing from the scope of this disclosure.

As illustrated in FIG. 3, the method 300 begins at step 302, where a determination is made whether to enable EPCS for a select set of links. If EPCS is not enabled for a select set of links, then at step 304, no action is needed. If EPCS is enabled for a select set of links, then at step 306, the AP MLD/AP or device can transmit a frame containing at least a link indication field.

In one embodiment, EPCS operation can be enabled for a certain set of links. Further, according to this embodiment, the EPCS device can maintain the EPCS priority access status for each link that it has formed with the AP MLD/AP and update the status of EPCS priority access on a per link basis.

Further, according to this embodiment, when EPCS priority access is enabled or during the setup process for a particular device, as shown in FIG. 3, the AP MLD/AP can transmit a frame containing at least one of the information fields indicated in Table 1 to the device. This frame can either be a new frame (e.g., information element) or can be one of the existing frames in the standard (e.g., the EPCS priority access enable request frame, the EPCS priority access enable response frame, etc.). The AP MLD/AP can also send one or more of the information in Table 1 to the EPCS device after EPCS setup either upon request from the device or in an unsolicited manner.

TABLE 1

| Information provided by AP MLD/AP to the EPCS device for per link EPCS operation | |
| --- | --- |
| Information fields | Description |
| Link indication field | A field to indicate which link(s) have been enabled for EPCS priority access operation. For instance, this can either be a list of link IDs corresponding to links for which EPCS priority access has been enabled. Alternatively, this can also be a bitmap indicating which links have been activated for EPCS priority access operation. For instance, when EPCS traffic comprises multiple TIDs, the link indication can include a mapping of at least one or more of the TIDs of EPCS traffic to one or more of the link(s) that are setup between the AP MLD and the non-AP MLD. The mapping can be provided in the form of a bitmap as stated above. The mapping can indicate which links one or more of the TIDs are mapped to. According to one embodiment, when this is done using a bitmap, there can be a bitmap for each TID. For a given TID, a value of 1 in bit position i of the bitmap can indicate that the particular TID is mapped to the link associated with the link ID i. A value of 0 in the bit position i can indicate that the particular TID is not mapped to the link associated with the link ID i. |
| Activation duration | The duration for which the link(s) have been provided with EPCS priority access operation. |
| EPCS operation parameters | The EPCS operation parameters (e.g., EDCA parameter set) to be used for EPCS operation on these links. These parameters can be indicated on a per link basis. Consequently, for each of the links indicated by the link indication field, the AP can provide a set of EPCS operation parameters. |
| Reason code | A code explaining why this frame is being transmitted. (e.g., to inform that EPCS operation has been enabled on a select set of links). |

When the EPCS device receives a frame containing at least one of the fields indicated in Table 1, the device can update its EPCS priority access status for the indicated links and start using the corresponding EPCS operation parameters.

In another embodiment, the EPCS device can request the AP MLD/AP to setup EPCS on a selected set of links. According to this embodiment, the EPCS device can transmit a frame containing at least one of the fields indicated in Table 2. Further, according to this embodiment, the frame can be transmitted during EPCS setup or after the EPCS setup is complete. This frame can either be a new frame (e.g., information element) or can be one of the existing frames in the standard (e.g., the EPCS priority access enable request frame, the EPCS priority access enable response frame, etc.).

TABLE 2

Information provided by EPCS device to the AP MLD/AP for per link EPCS operation

| Information fields | Description |
|---|---|
| Link indication field | A field to indicate which link(s) have been requested for EPCS priority access operation by the EPCS device. For instance, this can either be a list of link IDs corresponding to links for which EPCS priority access has been requested. Alternatively, this can also be a bitmap indicating which links have been requested for EPCS priority access operation. For instance, when EPCS traffic comprises multiple TIDs, the link indication can include a mapping of at least one or more of the TIDs of EPCS traffic to one or more of the link(s) that are setup between the AP MLD and the non-AP MLD. The mapping can be provided in the form of a bitmap as stated above. The mapping can indicate which links one or more of the TIDs are mapped to. According to one embodiment, when this is done using a bitmap, there can be a bitmap for each TID. For a given TID, a value of 1 in bit position i of the bitmap can indicate that the particular TID is mapped to the link associated with the link ID i. A value of 0 in the bit position i can indicate that the particular TID is not mapped to the link associated with the link ID i. |
| Activation duration | The duration for which the link(s) have been requested with EPCS priority access operation. |
| Reason code | A code explaining why this frame is being transmitted. (e.g., to request for EPCS operation to be enabled on a select set of links). |

Figure 4:
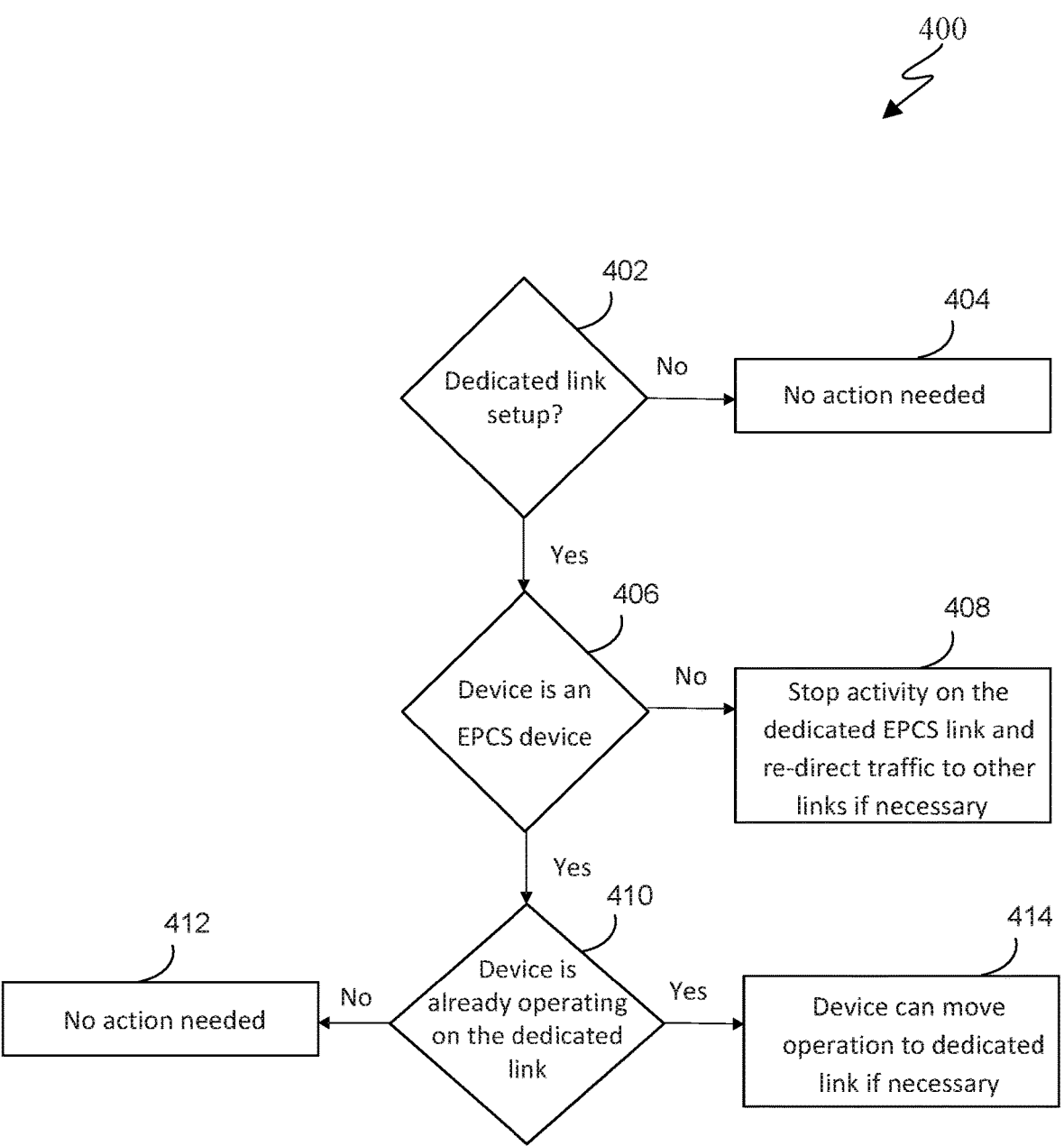
FIG. 4 illustrates an example method for dedicated link setup according to embodiments of the present disclosure.

FIG. 4 illustrates an example method 400 for dedicated link setup according to embodiments of the present disclosure. The embodiment of the example method 400 for dedicated link setup shown in FIG. 4 is for illustration only. Other embodiments of the example method 400 for dedicated link setup could be used without departing from the scope of this disclosure.

As illustrated in FIG. 4, the method 400 begins at step 402, where a determination is made whether there is a dedicated link setup. If there is not a dedicated link setup, then at step 404 no action is needed. At step 406, a determination is made whether a device is an EPCS device. If the device is not an EPCS device, then at step 408, activity is stopped on the dedicated EPCS link and traffic is redirected to other links if necessary. At step 410, a determination is made whether the device is already operating on the dedicated link. If the device is already operating on the dedicated link, then at step 412, no action is needed. If the device is not already operating on the dedicated link, then at step 414, the device can move operation to a dedicated link if necessary.

In another embodiment, the AP can setup a dedicated link(s) for EPCS priority access operation. According to this embodiment, the dedicated link(s) can be used only by EPCS devices. Non-EPCS devices can be prohibited from using this link(s). This embodiment does not restrict EPCS devices from using other links that are shared with non-EPCS devices. Consequently, on the dedicated link(s), EPCS devices do not need to compete with non-EPCS devices. AP MLD/AP can setup the dedicated link depending on a number of factors such as the network scenario, the requirements of EPCS and non-EPCS devices, etc. The AP MLD/AP can transmit at least one of the following information fields in a frame transmitted to the devices.

TABLE 3

Information transmitted by the AP MLD/AP to the devices for setting up dedicated EPCS link(s)

| Information fields | Description |
|---|---|
| Link indication field | A field to indicate which link(s) have been setup as dedicated EPCS link(s). For instance, this can either be a list of link IDs corresponding to those links. Alternatively, this can also be a bitmap indicating which links have been setup as dedicated EPCS link(s). For instance, when |

TABLE 3-continued

| Information transmitted by the AP MLD/AP to the devices for setting up dedicated EPCS link(s) | |
| --- | --- |
| Information fields | Description |
| | EPCS traffic comprises multiple TIDs, the link indication can include a mapping of at least one or more of the TIDs of EPCS traffic to one or more of the link(s) that are setup between the AP MLD and the non-AP MLD. The mapping can be provided in the form of a bitmap as stated above. The mapping can indicate which links one or more of the TIDs are mapped to. According to one embodiment, when this is done using a bitmap, there can be a bitmap for each TID. For a given TID, a value of 1 in bit position i of the bitmap can indicate that the particular TID is mapped to the link associated with the link ID i. A value of 0 in the bit position i can indicate that the particular TID is not mapped to the link associated with the link ID i. |
| Activation duration | The duration for which the link(s) have been setup as dedicated EPCS link(s). |
| Reason code | A code explaining why this frame is being transmitted. (e.g., to setup dedicated EPCS link(s)). |

After the AP sets up the dedicated link, the AP can advertise this link in management frames that it transmits. Consequently, all non-EPCS devices can stop transmissions on the dedicated link. EPCS device that are already on the link can continue transmissions and EPCS device that are not on this link can switch to this link if necessary.

Figure 5:
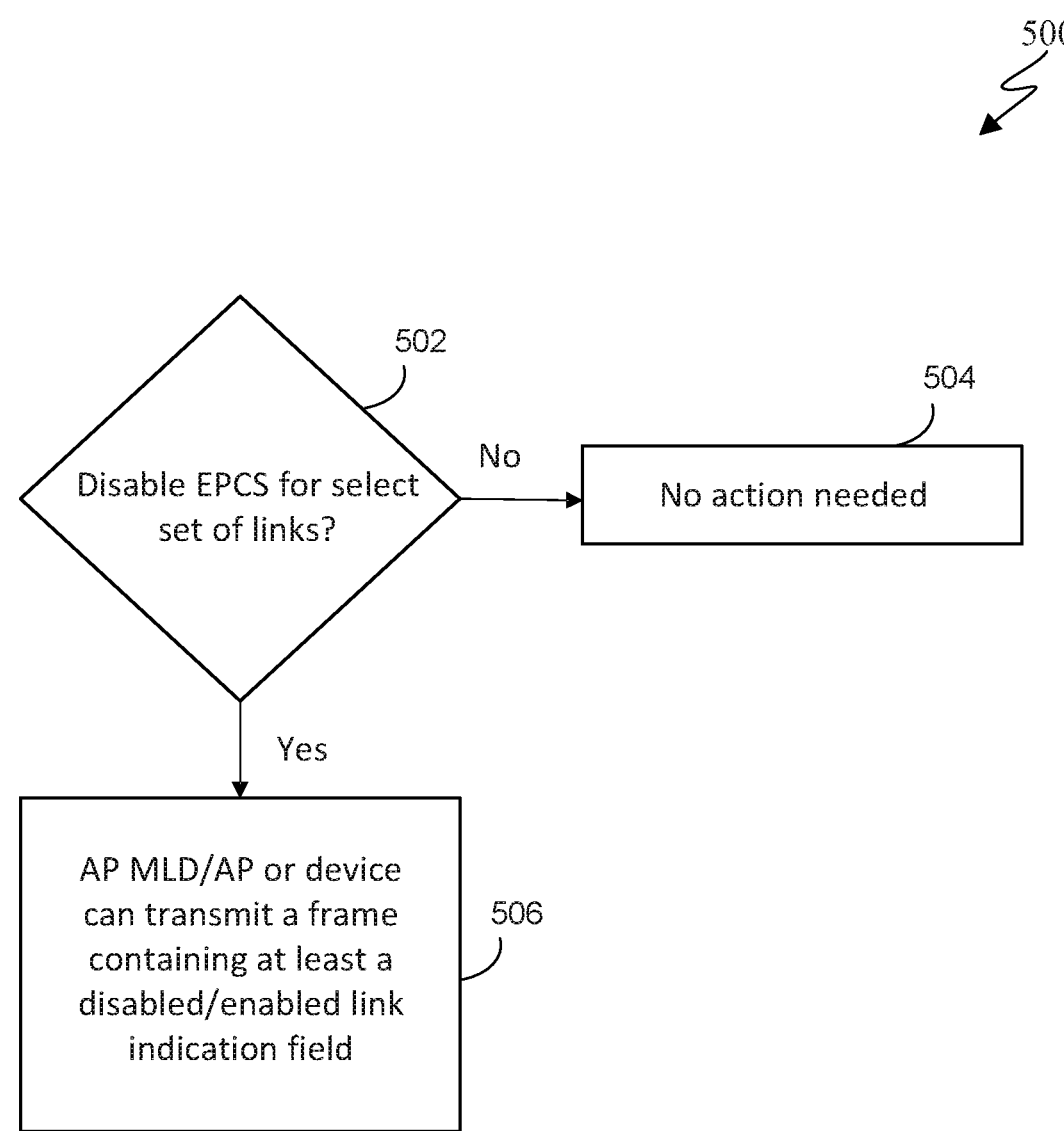
FIG. 5 illustrates an example method for disabling EPCS for a select set of links according to embodiments of the present disclosure.

FIG. 5 illustrates an example method 500 for disabling EPCS for a select set of links according to embodiments of the present disclosure. The embodiment of the example method 500 for disabling EPCS for a select set of links shown in FIG. 5 is for illustration only. Other embodiments of the example method 500 for disabling EPCS for a select set of links could be used without departing from the scope of this disclosure.

As illustrated in FIG. 5, the method 500 begins at step 502, where a determination is made whether to disable EPCS for a select set of links. If EPCS for a select set of links is not to be disabled, then at step 504, no action is needed. If EPCS for a select set of links is to be disabled, then at step 506, the AP MLD/AP or device can transmit a frame containing at least a disabled/enabled link indication field.

In one embodiment, the AP can transmit a frame to the EPCS device to disable EPCS priority access on a selected set of links. According to this embodiment, the AP can transmit a frame containing at least one of the following fields indicated in Table 4.

This frame can either be a new frame (e.g., information element) or can be one of the existing frames in the standard (e.g., the EPCS priority access teardown frame, etc.).

TABLE 4

| Information provided by AP MLD/AP to the EPCS device for disabling EPCS operation on a select set of links | |
| --- | --- |
| Information fields | Description |
| Disabled link indication field | A field to indicate which link(s) have been disabled for EPCS priority access operation by the AP MLD/AP. For instance, this can either be a list of link IDs corresponding to links for which EPCS priority access has been disabled. Alternatively, this can also be a bitmap indicating which links have been disabled for EPCS priority access operation. For instance, when EPCS traffic comprises multiple TIDs, the disabled link indication can include a mapping of at least one or more of the TIDs of EPCS traffic to one or more of the link(s) that are setup between the AP MLD and the non-AP MLD. The mapping can be provided in the form of a bitmap as stated above. The mapping can indicate which links one or more of the TIDs are mapped to. According to one embodiment, when this is done using a bitmap, there can be a bitmap for each TID. For a given TID, a value of 1 in bit position i of the bitmap can indicate that the particular TID is mapped to the link associated with the link ID i. A value of 0 in the bit position i can indicate that the particular TID is not mapped to the link associated with the link ID i. |
| Enabled link indication field | A field to indicate which link(s) have been currently enabled for EPCS priority access operation by the AP MLD/AP. For instance, this can either be a list of link IDs corresponding to links for which EPCS priority access has been enabled. Alternatively, this can also be a bitmap indicating which links have been enabled for EPCS priority access operation. For instance, when EPCS traffic comprises multiple TIDs, the disabled link indication can include a mapping of at least one or more of the TIDs of EPCS traffic to one or more of the link(s) that are setup between the AP MLD and the non-AP MLD. The mapping can be provided in the form of a bitmap as stated above. The mapping can indicate which links one or more of the TIDs are mapped to. |

TABLE 4-continued

Information provided by AP MLD/AP to the EPCS device for disabling
EPCS operation on a select set of links

| Information fields | Description |
| --- | --- |
| | According to one embodiment, when this is done using a bitmap, there can be a bitmap for each TID. For a given TID, a value of 1 in bit position i of the bitmap can indicate that the particular TID is mapped to the link associated with the link ID i. A value of 0 in the bit position i can indicate that the particular TID is not mapped to the link associated with the link ID i. |
| Deactivation duration | The duration for which the link(s) have been disabled with EPCS priority access operation. This can be useful for cases wherein the link(s) have been disabled temporarily and can be enabled in the future. |
| Reason code | A code explaining why this frame is being transmitted. (e.g., to request for EPCS operation to be enabled on a select set of links). |

When an EPCS device receives a frame disabling EPCS operation on a select set of link(s), it can stop using the EPCS operation parameters (e.g., enhanced EDCA parameter set) on those links and can switch back to normal EDCA parameter set for those indicated links. Further, the device can also update the EPCS status of the disabled link(s) to torn down.

In another embodiment, the AP can only provide an enabled link indication field and skip the disabled link indication field. When an EPCS device receives such a frame, it can consider the status of all links except those indicated in the enabled link indication field as torn down.

The above frame can also be transmitted by the EPCS device to the AP MLD/AP to request disablement of EPCS priority access operation on select set of links. When the AP MLD/AP receives such a frame, it can transmit a response frame containing one or more of the fields indicated in Table 4. In such a frame, the fields can indicate the link(s) that have been approved by the AP for disablement and the duration that the AP has approved for disablement.

When link level EPCS service is setup, the link indication information (e.g., via the link indication field) can apply to the traffic of a non-AP MLD (for downlink and/or uplink) after EPCS priority access is enabled. After EPCS priority access is disabled, the link level setup that existed before enabling EPCS priority access service (e.g., based on TID to link mapping) can be used again.

According to one embodiment, the device can inform the AP MLD/AP which type of traffic can be treated as EPCS traffic. Further, according to this embodiment, the device can transmit a frame to the AP containing one or more of the fields indicated in Table 5. This can help to differentiate EPCS traffic from non-EPCS traffic.

TABLE 5

Frame transmitted by the device to the AP MLD/AP to inform/request which type
of traffic can be treated as EPCS

| Information fields | Description |
| --- | --- |
| Traffic/service ID/ID list | A field to differentiate EPCS traffic from non-EPCS traffic. For instance, this can be list of traffic/service identifiers (e.g., TIDs or any unique ID that identifies traffic streams) which correspond to traffic streams that need to be treated as EPCS traffic. Alternatively, this can also be a bitmap containing indication of which traffic streams can be treated as EPCS traffic (e.g., TID/service ID bitmap). |
| Activation duration | The duration for which the traffic stream(s) can be provided EPCS priority access. |
| Reason code | A code explaining why this frame is being transmitted. (e.g., to request for EPCS operation for select of traffic streams). |

When the AP receives the frame from the device, it can transmit a frame containing one or more of the fields indicated in Table 6.

TABLE 6

Frame transmitted by the device to the AP MLD/AP to inform which type of traffic
can be treated as EPCS

| Information fields | Description |
| --- | --- |
| Traffic ID list | The list of traffic IDs that the AP MLD/AP accepted for EPCS operation based on the device's request. For instance, this can either be a list of traffic IDs or a bitmap (e.g., TID bitmap) indicating the relevant information. |

TABLE 6-continued

Frame transmitted by the device to the AP MLD/AP to inform which type of traffic
can be treated as EPCS

| Information fields | Description |
| --- | --- |
| Activation duration | The duration for which the traffic stream(s) have been provided with EPCS priority access. AP can either accept device's recommendation or make its own. |
| Reason code | A code explaining the decisions made by the AP MLD/AP. (e.g., why AP MLD/AP did not accept some of the device's requests). |

In another embodiment, the AP MLD can implicitly accept the device's request and not respond with any frame.

The above information can be transmitted by the device separately or as a part of the enable or parameter update procedures described below.

Figure 6:
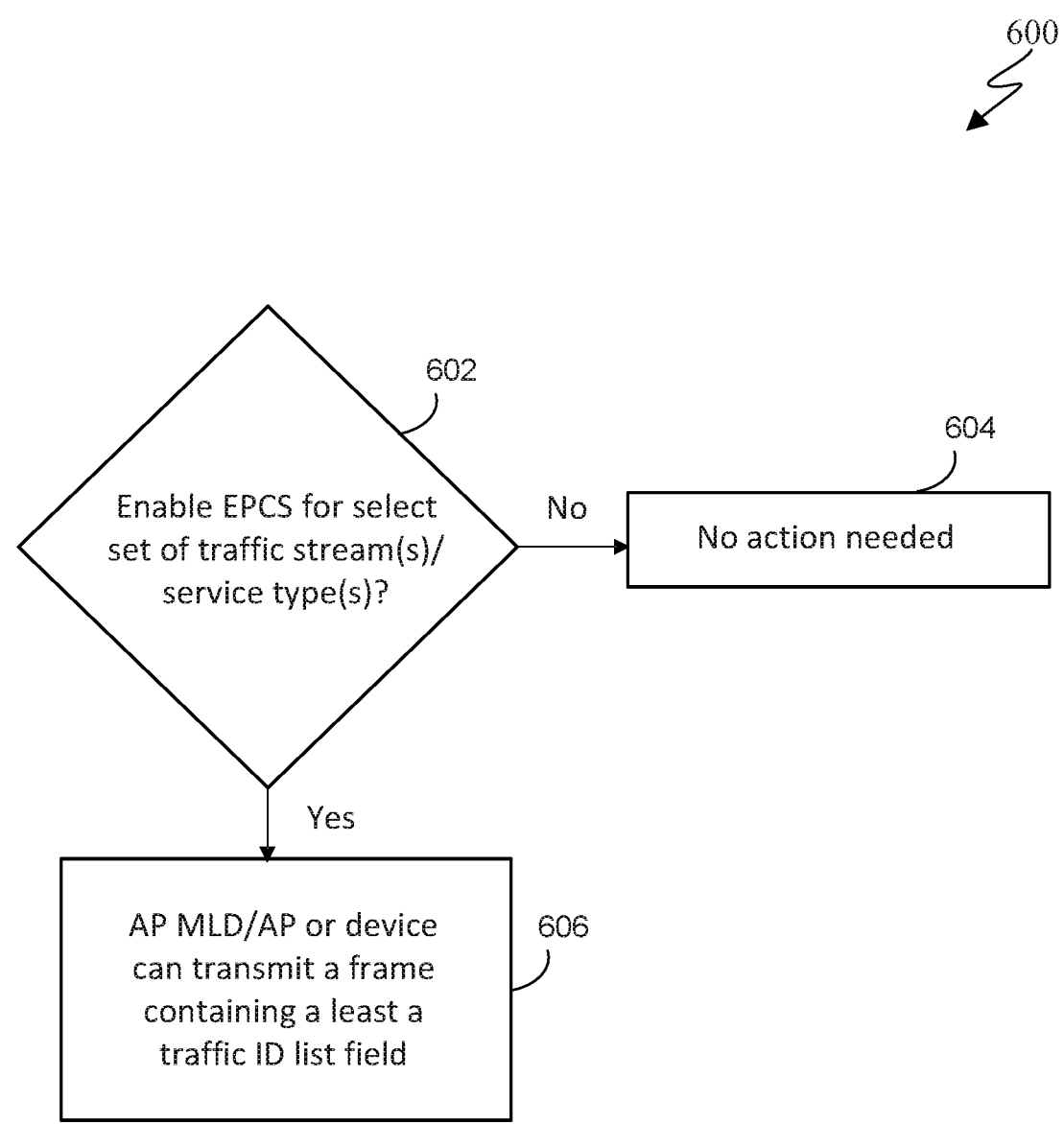
FIG. 6 illustrates an example method for enabling EPCS for selected traffic stream(s)/service type(s) according to embodiments of the present disclosure.

FIG. 6 illustrates an example method 600 for enabling EPCS for selected traffic stream(s)/service type(s) according to embodiments of the present disclosure. The embodiment of the example method 600 for enabling EPCS for selected traffic stream(s)/service type(s) shown in FIG. 6 is for illustration only. Other embodiments of the example method 600 for enabling EPCS for selected traffic stream(s)/service type(s) could be used without departing from the scope of this disclosure.

can provide different EPCS priority access operation parameters (e.g., enhanced EDCA parameter set) for each traffic stream according to its own characteristics.

Further, according to this embodiment, when EPCS priority access is enabled for a particular device, the AP MLD/AP can transmit a frame containing at least one of the information fields indicated in Table 7 to the device as shown in FIG. 6. This frame can either be a new frame (e.g., information element) or can be one of the existing frames in the standard (e.g., the EPCS priority access enable request frame, the EPCS priority access enable response frame, etc.). The AP can also send the information in Table 7 to the EPCS device after EPCS setup either upon request from the device or in an unsolicited manner.

TABLE 7

Information provided by AP MLD/AP to the EPCS device for per traffic stream/service
type EPCS operation

| Information fields | Description |
| --- | --- |
| Traffic indication field | A field to indicate which traffic streams/service types(s) have been enabled for EPCS priority access operation. For instance, this can either be a list of TIDs/service type IDs corresponding to traffic streams/service types for which EPCS priority access has been enabled. Alternatively, this can also be a bitmap indicating which traffic streams/service types have been activated for EPCS priority access operation (e.g., TID bitmap). |
| Activation duration | The duration for which the traffic streams/service types (s) have been provided with EPCS priority access operation. |
| EPCS operation parameters | The EPCS operation parameters (e.g., EDCA parameter set) to be used for EPCS operation for these traffic streams/service types. These parameters can be indicated on a per traffic stream/service type basis. Consequently, for each of the traffic streams/service types indicated by the traffic indication field, the AP can provide a set of EPCS operation parameters based on their own unique characteristics. |
| Reason code | A code explaining why this frame is being transmitted. (e.g., to inform that EPCS operation has been enabled on a select set of traffic streams/service types). |

As illustrated in FIG. 6, the method 600 begins at step 602, where a determination is made whether to enable EPCS for a select set of traffic stream(s)/service type(s). If EPCS for a select set of traffic stream(s)/service type(s) is not enabled, then at step 604, no action is needed. If EPCS for a select set of traffic stream(s)/service type(s) is enabled, then at step 606, the AP MLD/AP or device can transmit a frame containing at least a traffic ID list field.

In one embodiment, EPCS operation can be enabled for certain traffic streams. Further, according to this embodiment, the EPCS device can maintain the EPCS priority access status for each traffic stream that it has formed with the AP MLD/AP and update the status of EPCS priority access on a per traffic stream basis. Further, the AP MLD/AP When the EPCS device receives a frame containing at least one of the fields indicated in Table 7, the device can update its EPCS priority access status for the indicated traffic streams/service types and start using the corresponding EPCS operation parameters. The above information can also be exchanged as a part of the EPCS priority access setup procedure.

In another embodiment, the EPCS device can request the AP MLD/AP to setup EPCS on a select set of traffic streams/service types. According to this embodiment, the EPCS device can transmit a frame containing at least one of the fields indicated in Table 8. Further, according to this embodiment, the frame can be transmitted during EPCS setup or after the EPCS setup is complete. This frame can either be a new frame (e.g., information element) or can be one of the existing frames in the standard (e.g., the EPCS priority access enable request frame, the EPCS priority access enable response frame, etc.).

type(s), it can stop using the EPCS operation parameters (e.g., enhanced EDCA parameter set) on those traffic

TABLE 8

Information provided by EPCS device to the AP MLD/AP for per traffic stream/
service type EPCS operation

| Information fields | Description |
| --- | --- |
| Traffic indication field | A field to indicate which traffic stream(s)/service type(s) have been requested for EPCS priority access operation by the EPCS device. For instance, this can either be a list of TIDs/service type IDs corresponding to traffic streams/service types for which EPCS priority access has been requested. Alternatively, this can also be a bitmap indicating which traffic streams/service types have been requested for EPCS priority access operation. |
| Activation duration | The duration for which the traffic stream(s)/service type(s) have been requested with EPCS priority access operation. |
| Reason code | A code explaining why this frame is being transmitted. (e.g., to request for EPCS operation to be enabled on a select set of traffic streams/service types). |

The EPCS device can transmit the above indicated frame to the AP MLD/AP either as a part of the EPCS priority access setup procedure or in an unsolicited manner. When the AP receives the above frame, it can transmit a response frame containing one or more fields indicated in Table 6 to the EPCS device. In such a frame, the traffic indication field and the activation duration can indicate which traffic stream(s)/service type(s) the AP MLD/AP has authorized for EPCS priority access operation.

In one embodiment, the AP MLD/AP can transmit a frame to the EPCS device to disable EPCS priority access for a select set of traffic stream(s)/service type(s). According to this embodiment, the AP can transmit a frame containing at least one of the following fields indicated in Table 9. This frame can either be a new frame (e.g., information element) or can be one of the existing frames in the standard (e.g., the EPCS priority access teardown frame, etc.).

stream(s)/service type(s) and can switch back to normal EDCA parameter set for those indicated traffic stream(s)/service type(s). Further, the device can also update the EPCS status of the disabled traffic stream(s)/service type(s) to torn down.

In another embodiment, the AP can only provide an enabled traffic stream/service type indication field and skip the disabled traffic stream/service type indication field. When an EPCS device receives such a frame, it can consider the status of all traffic stream(s)/service type(s) except those indicated in the enabled traffic stream/service type indication field as torn down.

The above frame can also be transmitted by the EPCS device to the AP MLD/AP to request disablement of EPCS priority access operation on select set of traffic stream(s)/service type(s). When the AP MLD/AP receives such a frame, it can transmit a response frame containing one or

TABLE 9

Information provided by AP MLD/AP to the EPCS device for disabling EPCS operation
on a select set of links

| Information fields | Description |
| --- | --- |
| Disabled traffic stream/service type indication field | A field to indicate which traffic stream(s)/service type(s) have been disabled for EPCS priority access operation by the AP MLD/AP. For instance, this can either be a list of traffic stream IDs (e.g., TIDs)/service type IDs corresponding to traffic stream(s)/service type(s) for which EPCS priority access has been disabled. Alternatively, this can also be a bitmap indicating which traffic stream(s)/service type(s) have been disabled for EPCS priority access operation (e.g., TID bitmap). |
| Enabled traffic stream/service type indication field | A field to indicate which traffic stream/service type have been currently enabled for EPCS priority access operation by the AP MLD/AP. For instance, this can either be a list of traffic stream IDs (e.g., TIDs)/service type IDs corresponding to links for which EPCS priority access has been enabled. Alternatively, this can also be a bitmap indicating which traffic stream(s)/service type(s) have been enabled for EPCS priority access operation (e.g., TID bitmap). |
| Deactivation duration | The duration for which the traffic stream(s)/service type(s) have been disabled with EPCS priority access operation. This can be useful for cases wherein the traffic stream(s)/service type(s) have been disabled temporarily and can be enabled in the future. |
| Reason code | A code explaining why this frame is being transmitted. (e.g., to request for EPCS operation to be enabled on a select set of traffic stream(s)/service type(s)). |

When an EPCS device receives a frame disabling EPCS operation on a selected set of traffic stream(s)/service more of the fields indicated in Table 8. In such a frame, the fields can indicate the traffic stream(s)/service type(s) that have been approved by the AP for disablement and the duration that the AP has approved for disablement.

The per link and per traffic stream(s)/service type(s) EPCS operation indicated by the above embodiments can also be combined together to enable EPCS operation on a per link per traffic stream(s)/service type(s) basis. In such a case, a combination of information provided for per link basis operation and per traffic stream(s)/service type(s) operation can be exchanged between the AP MLD/AP and the EPCS device. For example, when requesting EPCS priority access enablement, the device can transmit a frame indicating both which link(s) it wants EPCS priority access operation enabled and also the traffic stream(s)/service type(s) on those links that it wants EPCS priority access operation to be enabled.

The EPCS control field can also contain information fields in addition to those mentioned in this disclosure.

An AP MLD/AP that provides a support for link and/or traffic level EPCS operation can advertise via frames that it transmits (e.g., management frames such as beacon or probe response frames). For instance, there can be a field/subfield that can be carried in transmitted frames (e.g., management frames such as beacons) which can indicate that the APMLD/AP supports link and/or traffic level EPCS operation. Based on this indication, the non-AP MLD can discover such an AP MLD side capability. For example, the field/subfield can be a bit set to 1 when AP MLD can support link and/or traffic level EPCS operation and to 0 when the AP MLD cannot support link and/or traffic level EPCS operation.

TABLE 10

Information provided by AP MLD/AP to EPCS device for per link and per traffic
stream(s)/service type(s) operation

| Information fields | Description |
|---|---|
| Link indication field | A field to indicate which link(s) have been setup as dedicated EPCS link(s). For instance, this can either be a list of link IDs corresponding to those links. Alternatively, this can also be a bitmap indicating which links have been setup as dedicated EPCS link(s) for the specified traffic stream(s)/service type(s). When this indication is done using a bitmap, the field can also be called EPCS Link Bitmap. An example of EPCS Link Bitmap usage can be as follows. When the non-AP MLD has three links setup with the AP with link IDs equal to 0, 1 and 2 respectively, and links with link ID equal to 0 and 1 are used for EPCS operation and 2 is not used for EPCS operation, then the bits corresponding to position 0 and 1 in the EPCS Link Bitmap can be set to 1 and the bit corresponding to the position 2 can be set to 0. This example can also apply to EPCS Link Bitmap usage described in any of the tables in this disclosure. |
| Activation duration | The duration for which the link(s) have been setup as dedicated EPCS link(s). |
| Reason code | A code explaining why this frame is being transmitted. (e.g., to setup dedicated EPCS link(s) for specified traffic stream(s)/service type(s)). |
| Traffic indication field | A field to indicate which traffic streams/service types(s) have been enabled for EPCS priority access operation. For instance, this can either be a list of (or individual) TIDs/service type IDs corresponding to traffic streams/service types for which EPCS priority access has been enabled. Alternatively, this can also be a bitmap indicating which traffic streams/service types have been activated for EPCS priority access operation (e.g., TID bitmap). |
| Activation duration | The duration for which the traffic streams/service types (s) have been provided with EPCS priority access operation. |
| EPCS operation parameters | The EPCS operation parameters (e.g., EDCA parameter set) to be used for EPCS operation for these traffic streams/service types. These parameters can be indicated on a per traffic stream/service type basis. Consequently, for each of the traffic streams/service types indicated by the traffic indication field, the AP can provide a set of EPCS operation parameters based on their own unique characteristics. |

An example of the combination of the information (described in previous embodiments) that can be exchanged between the AP MLD/AP and the EPCS device can be as described in Table 10. According to this example, the AP MLD/AP can transmit a frame containing one or more of the information fields indicated in Table 10.

Further, according to this embodiment, the AP MLD/AP can group one or more of the information field and can transmit them in an independent frame or as a part of an existing frame in the standard (e.g., the EPCS Priority Access Enable Request frame, EPCS Priority Access Enable Response Frame, EPCS Priority Access Teardown Frame, etc.). Further, one of more of the information fields transmitted by the AP MLD/AP to the EPCS device can be grouped together and can be called as EPCS control field.

Consequently, an EPCS device that wants to setup link and/or traffic level EPCS operation can identify appropriate AP MLD/AP based on such an indication and can associate accordingly.

According to another embodiment, a non-AP MLD that can provide a support for link and/or traffic level EPCS operation can advertise the capability via frames that it transmits (e.g., management frames such as (Re)association request frames or probe request frames). For instance, there can be a field/subfield that can be carried in transmitted frames (e.g., management frames such as (Re)association request frames or probe request frames) that can make such an indication. Based on this indication, an AP MLD can understand that the non-AP MLD has such a capability support. For example, the field/subfield can be a bit set to 1 when the non-AP MLD can support link and/or traffic level EPCS operation and to 0 when the non-AP MLD cannot support link and/or traffic level EPCS operation.

The frames used in the above embodiments can either be new frames (e.g., information element) or can be any of the existing frames in the standard (e.g., the EPCS priority access related frame, etc.).

In the above embodiments, the word traffic can refer to both traffic types such as those defined in the spec (e.g., based on access category, TID, etc.) as well as service types/services.

The above embodiments also extend to single link devices (e.g., non-EHT, non-ML STA). In case of single link devices (e.g., non-EHT, non-ML STA), the above procedure can be carried out on the link that is setup between the device and the AP. In the case of multi-link devices, the above procedures can be carried out on any of the links setup between the device and the AP MLD.

FIG. 7 illustrates a flowchart of a method 700 for wireless communication performed by a non-AP device that includes STAs according to embodiments of the present disclosure. The embodiment of the method 700 for wireless communication performed by a non-AP device shown in FIG. 7 is for illustration only. Other embodiments of the method 700 for wireless communication performed by a non-AP device could be used without departing from the scope of this disclosure.

As illustrated in FIG. 7, the method 700 begins at step 702, where the non-AP MLD forms a link with a corresponding AP of an AP MLD. At step 704, the non-AP MLD receives information associated with EPCS priority access from the corresponding AP. At step 706, the non-AP MLD determines whether the EPCS priority access is enabled on all of the links between the STAs and the corresponding APs. At step 708, when the EPCS priority access is enabled for all of the links between the STAs and the corresponding APs, the non-AP MLD continues with current EPCS priority access. At step 710, when the EPCS priority access is not enabled for all of the links between the STAs and the corresponding APs, the non-AP MLD performs the EPCS priority access on some but not all of the links between the STAs and the corresponding APs.

In one embodiment, all of the links between the STAs and the corresponding APs support the EPCS priority access, the EPCS priority access is not enabled for all of the links between the STAs and the corresponding APs, and the non-AP MLD receives a message from the corresponding AP indicating which links can be used for EPCS priority access, and based on the received message indicating which links can be used for EPCS priority access, performs the EPCS priority access on the indicated links.

In one embodiment, the non-AP MLD transmits a message to the corresponding AP requesting links to be used for EPCS priority access.

In one embodiment, all of the links between the STAs and the corresponding APs support the EPCS priority access, the EPCS priority access is not enabled for all of the links between the STAs and the corresponding APs, and the non-AP MLD receives a message from the corresponding AP indicating dedicated links which can only be used for EPCS priority access by EPCS devices, and based on the received message indicating the dedicated links, performs the EPCS priority access on the dedicated links.

In one embodiment, all of the links between the STAs and the corresponding APs support the EPCS priority access, the EPCS priority access is not enabled for all of the links between the STAs and the corresponding APs, and the non-AP MLD receives a message from the corresponding AP indicating links associated with a service for which EPCS priority access is authorized, and based on the received message indicating the links associated with the service for which EPCS priority access is authorized, performs the EPCS priority access on the indicated links associated with the service for which the EPCS priority access is authorized.

In one embodiment, the non-AP MLD transmits a message to the corresponding AP indicating which types of services to grant EPCS priority access to.

In one embodiment, all of the links between the STAs and the corresponding APs support the EPCS priority access, the EPCS priority access is not enabled for all of the links between the STAs and the corresponding APs, and the on-AP MLD receives a message from the corresponding AP indicating which links can be used for EPCS priority access, receives a message from the corresponding AP indicating links associated with a service for which EPCS priority access is authorized, and based on the received message indicating which links can be used for EPCS priority access and the received message indicating the links associated with the service for which EPCS priority access is authorized, performs the EPCS priority access on one or more of the indicated links.

The above flowcharts illustrate example methods that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD) comprising:
   stations (STAs), each comprising a transceiver; and
   a processor operably coupled to the transceivers, the processor configured to:
   form links with corresponding APs of an AP MLD;
   receive information associated with emergency preparedness communication services (EPCS) priority access from the corresponding APs;
   determine that the EPCS priority access is enabled on all of the links between the STAs and the corresponding APs;
   receive a frame from the AP MLD;
   in response to the received frame, set at least one link of the links as a dedicated link that is prohibited from being used by non-EPCS devices; and
   perform the EPCS priority access on the at least one link.

2. The non-AP MLD of claim 1, wherein the frame includes information associated with the dedicated link.

3. The non-AP MLD of claim 2, wherein the information associated with the dedicated link includes a link indication field that indicates which link has been set up as the dedicated link.

4. The non-AP MLD of claim 2, wherein the information associated with the dedicated link includes an activation duration field including a duration for which at least one link has been set up as the dedicated link.

5. The non-AP MLD of claim 1, wherein the frame is one of a management frame, an EPCS priority access enable request frame, and an EPCS priority access enable response frame.

6. The non-AP MLD of claim 1, wherein the processor is further configured to update an EPCS priority access status of the links based on the received frame including information associated with the EPCS priority access.

7. An access point (AP) multi-link device (MLD) comprising:

APs, each comprising a transceiver; and a processor operably coupled to the transceivers, the processor configured to:

form links with corresponding stations (STAs) of a non-AP MLD;

transmit information associated with emergency preparedness communication services (EPCS) priority access to the corresponding STAs;

determine that the EPCS priority access is enabled on all of the links between the APs and the corresponding STAs;

set at least one link of the links as a dedicated link that is prohibited from being used by non-EPCS devices; and transmit a frame including information associated with the dedicated link to the non-AP MLD.

8. The AP MLD of claim 7, wherein the frame includes information associated with the dedicated link.

9. The AP MLD of claim 8, wherein the information associated with the dedicated link includes a link indication field that indicates which link has been set up as the dedicated link.

10. The AP MLD of claim 7, wherein the information associated with the dedicated link includes an activation duration field including a duration for which at least one link has been set up as the dedicated link.

11. The AP MLD of claim 7, wherein the frame is one of a management frame, an EPCS priority access enable request frame, and an EPCS priority access enable response frame.

12. A method for wireless communication performed by a non-access point (AP) multi-link device (MLD) that includes stations (STAs), the method comprising:

forming links with corresponding APs of an AP MLD;

receiving information associated with emergency preparedness communication services (EPCS) priority access from the corresponding APs;

determining that the EPCS priority access is enabled on all of the links between the STAs and the corresponding APs;

receiving a frame from the AP MLD;

in response to the received frame, setting at least one link of the links as a dedicated link that is prohibited from being used by non-EPCS devices; and performing the EPCS priority access on the at least one link.

13. The method of claim 12, wherein the frame includes information associated with the dedicated link.

14. The method of claim 13, wherein the information associated with the dedicated link includes a link indication field that indicates which link has been set up as the dedicated link.

15. The method of claim 13, wherein the information associated with the dedicated link includes an activation duration field including a duration for which at least one link has been set up as the dedicated link.

16. The method of claim 12, wherein the frame is one of a management frame, an EPCS priority access enable request frame, and an EPCS priority access enable response frame.

17. The method of claim 16, further comprising updating an EPCS priority access status of the links based on the received frame including information associated with the EPCS priority access.

* * * * *